United States Patent
Ouchi et al.

(10) Patent No.: US 6,221,528 B1
(45) Date of Patent: Apr. 24, 2001

(54) HYDROGEN-ABSORBING ALLOY ELECTRODE FOR ALKALINE SECONDARY BATTERY AND METHOD OF MANUFACTURING THEREOF

(75) Inventors: Masutaka Ouchi, Tokushima; Teruhiko Imoto; Kikuko Kato, both of Katano; Nobuyuki Higashiyama, Minoo; Mamoru Kimoto, Hirakata; Shin Fujitani, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/333,933

(22) Filed: Jun. 16, 1999

(30) Foreign Application Priority Data

Jun. 17, 1998 (JP) .................................................. 10-169948

(51) Int. Cl.$^7$ ....................................................... H01M 4/58
(52) U.S. Cl. ........................ 429/218.2; 429/59; 429/212; 29/623.5; 420/900
(58) Field of Search ................................... 429/218.2, 59, 429/212; 420/900

(56) References Cited

U.S. PATENT DOCUMENTS 5,518,509   5/1996   Tadokoro et al. .................. 29/623.5

FOREIGN PATENT DOCUMENTS

| 4-179055 | 6/1992 | (JP) . |
| 5-195008 | * 8/1993 | (JP) . |
| 5-225975 | 9/1993 | (JP) . |
| 8-279356 | 10/1996 | (JP) . |

* cited by examiner

Primary Examiner—Laura Weiner
(74) Attorney, Agent, or Firm—Kubovcik & Kubovcik

(57) ABSTRACT

A hydrogen-absorbing alloy electrode for an alkaline secondary battery. The electrode is made from a hydrogen-absorbing alloy containing nickel which has been treated with an acidic solution containing a chelating agent for nickel. The hydrogen-absorbing alloy electrode has good activity and a nickel-hydrogen battery having the hydrogen-absorbing alloy electrode as a negative electrode has a large high rate discharge capacity soon after being assembled, and inhibits an increase of internal pressure during discharge.

6 Claims, 1 Drawing Sheet

HYDROGEN-ABSORBING ALLOY ELECTRODE FOR ALKALINE SECONDARY BATTERY AND METHOD OF MANUFACTURING THEREOF

FIELD OF THE INVENTION

The present invention relates to a hydrogen-absorbing alloy electrode for an alkaline secondary battery and a method of manufacturing the electrode.

BACKGROUND OF THE INVENTION

An alkaline secondary battery, which uses a metal compound, for example, nickel hydroxide, for a positive electrode and a hydrogen-absorbing alloy for a negative electrode, such as a nickel-metal hydride battery, has lately been attracting attention as a high energy density battery for replacing nickel-cadmium batteries. The reason for this attention is that nickel-metal hydride batteries have more than twice the capacity of nickel-cadmium batteries, and have better environmental suitability.

The hydrogen-absorbing alloys used for a negative electrode of nickel-metal hydride batteries include Mm series hydrogen-absorbing alloys, where "Mm" is a so-called "Misch Metal" and is a mixture of rare earth elements, such as La, Ce, Nd, Pr, etc., and Laves phase alloys.

It sometimes happens that the surface of a hydrogen-absorbing alloy is coated with oxide formed by natural oxidization. This coating inhibits the absorption of hydrogen gas. When a battery having a hydrogen-absorbing alloy electrode is manufactured using an oxidized hydrogen-absorbing alloy, the battery cannot provide sufficient discharge capacity. It is also a problem that internal pressure of the battery increases during charge.

A method to immerse a hydrogen-absorbing alloy in an acid solution such as hydrochloric acid and to dissolve an oxide coating on the surface of the alloy to remove the coating from the alloy surface and expose electrochemically active portions of the surface of the alloy is disclosed in Japanese Patent Laid-Open Publication No. 5-225975. The method is somewhat useful to increase electrochemical activity of a hydrogen-absorbing alloy electrode.

However, even if electrochemically active portions are exposed on the surface of the alloy, they are easily oxidized in air. The conventional method to treat a hydrogen-absorbing alloy is immersing and stirring alloy particles in an acid solution to remove the oxidized coating of the surface and to increase the electrochemical activity of a hydrogen-absorbing alloy electrode. However, since not only the oxidized surface but also the hydrogen-absorbing alloy itself is corroded by the acidic solution, the surface of the alloy is easily oxidized.

There still has not been obtained a solution to increase discharge capacity of an alkaline secondary battery having a hydrogen-absorbing alloy electrode and to inhibit an increase of internal pressure of the battery during discharge.

OBJECTS OF THE INVENTION

An object of the present invention is to solve the problems of a hydrogen-absorbing alloy electrode for a nickel-hydrogen battery as explained above. That is, one object of the present invention is to sufficiently increase electrochemical activity of the hydrogen-absorbing alloy, and another is to inhibit increase of internal pressure of the battery during discharge.

A further object of the present invention is to provide a hydrogen-absorbing alloy electrode which has excellent discharge characteristics under heavy-current.

SUMMARY OF THE INVENTION

The present invention provides a hydrogen-absorbing alloy electrode for an alkaline secondary battery comprising a hydrogen-absorbing alloy containing nickel, wherein the hydrogen-absorbing alloy comprising nickel is treated with an acidic solution containing a chelating agent for nickel.

Figure 1:
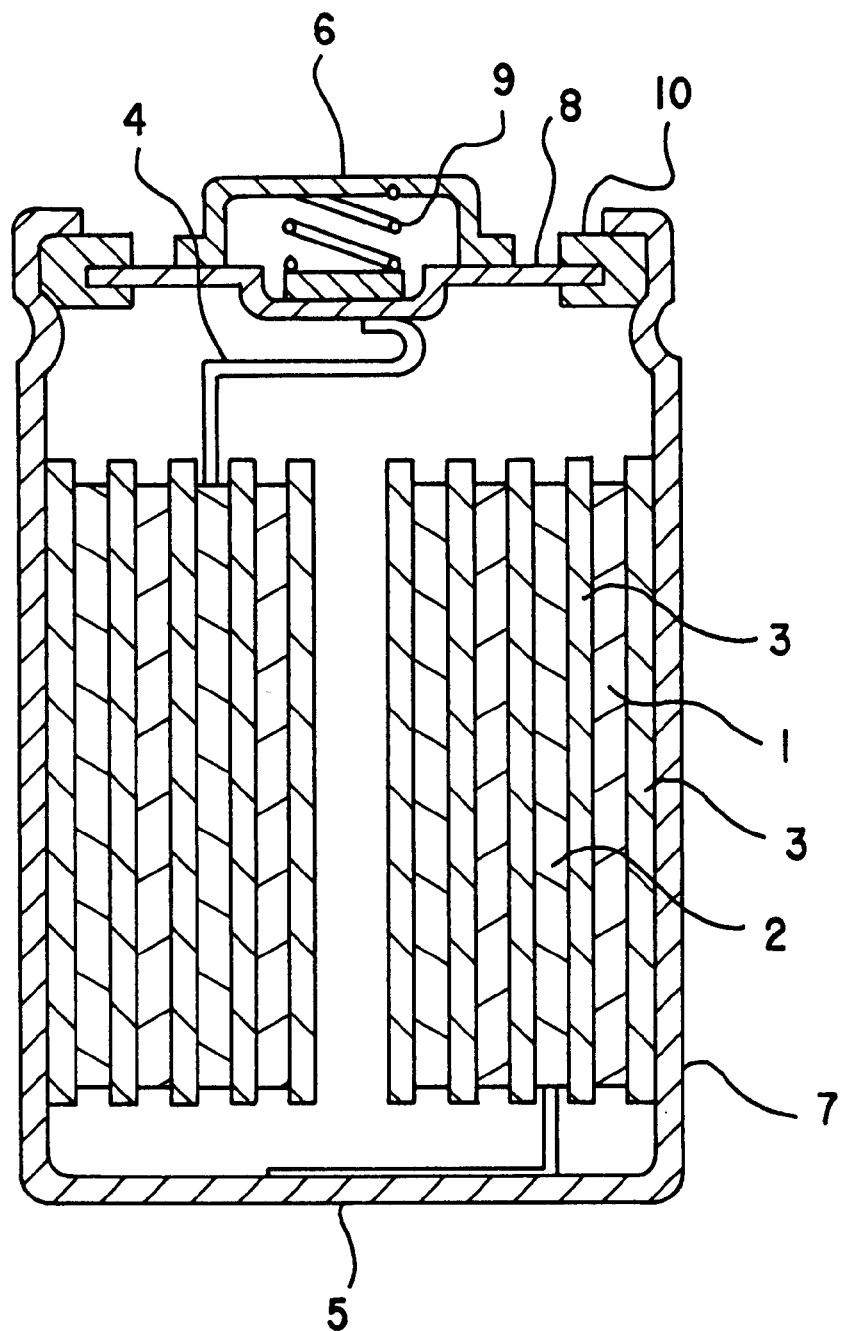
FIG. 1 is a sectional view of a storage battery.

| | |
|---|---|
| 1 | a positive electrode |
| 2 | a negative electrode |
| 3 | a separator |
| 4 | a positive lead |
| 5 | a negative lead |
| 6 | a positive external terminal |
| 7 | a negative can |
| 8 | a sealing lid |
| 9 | a coil spring |
| 10 | an insulating packing |

DETAILED EXPLANATION OF THE INVENTION

A hydrogen-absorbing alloy containing nickel is treated with an acidic solution containing a chelating agent for nickel in the present invention. After treatment with the acidic solution, the surface of the alloy is rich with nickel, and the alloy is resistant to oxidization and has an active surface to absorb hydrogen. It is believed that eluted nickel forms a chelate with the chelating agent during treatment, and forms a metal nickel layer which is stable in air.

The layer of nickel contains many air gaps, which it is believed are created by escape of rare earth elements from the alloy. An electrolyte infiltrates into the air gaps to increase contact area between the electrolyte and hydrogen-absorbing alloy particles. This helps to reduce extra voltage caused by discharge reaction at the electrode.

Therefore, a hydrogen-absorbing alloy electrode of the present invention has excellent activity and a nickel-hydrogen battery including the hydrogen-absorbing alloy electrode as a negative electrode is inhibited with respect to an increase in its internal pressure during discharge and also has excellent discharge characteristics under heavy-current.

The present invention improves characteristics of a battery prepared from various hydrogen-absorbing alloys, including not only alloys prepared in an argon arc furnace but also alloys prepared by other methods, for example, a gas atomizing method, roll quenching method, and the like.

The hydrogen-absorbing alloy useful in the present invention contains nickel. A hydrogen-absorbing alloy having CaCu5 type crystal structure and represented by the formula $MmNi_xCo_yMn_zM_{1-z}$ (where "Mm", a so-called "Misch Metal" is a mixture of rare earth elements, such as La, Ce, Nd, Pr, etc.), in which x is $3.0 \leq x \leq 5.2$, y is $0 \leq y \leq 1.2$ and z is $0.1 \leq z \leq 0.9$, the total of x, y and z is $4.4 \leq x+y+z \leq 5.4$, and M is selected from aluminum (Al), copper (Cu), iron (Fe), boron (B), chromium (Cr) and silicon (Si), is suitable for the present invention. $MmNi_{3.1}Co_{0.8}Al_{0.4}Mn_{0.7}$ is one of the suitable alloys. If an alloy is chosen from those described above, corrosion in an alkaline electrolyte is inhibited and an increased amount of absorbed hydrogen can be expected.

Average diameter of alloy particles used in the present invention is preferably not greater than 100 μm and, more preferably, not greater than 80 μm to obtain sufficient improvement in reduction of internal pressure of the battery during discharge and to obtain sufficient initial discharge characteristics.

The chelating agents added to an acidic solution in the present invention are not particularly limited if they can form a chelate with nickel. Nitrogen compounds and sulfur compounds can be used. 2,2'-bipyridine, diethyldithiocarbamate, 2-mercaptobenzothiazole, Metanil Yellow and potassium hexacyanoferrate (III) are preferable.

The amount of the chelating agent is preferably in a range of 1.0 to 100 ppm based on the weight of the hydrogen-absorbing alloy. If an amount of the chelating agent is less than 1.0 ppm, a sufficient metallic nickel layer cannot be formed on the surface of alloy particles so as to an obtain expected improvement of battery characteristics. On the other hand, if an amount of the chelating agent is greater than 100 ppm, excess amount of the agent adheres to the surface of the alloy particles after treatment and is likely to inhibit electrochemical reactions between the alloy particles and electrolyte.

As the acidic solution useful in the present invention, hydrochloric acid, nitric acid and sulfuric acid can be mentioned. Preferable pH of the acidic solution is in a range of 0.7 to 2.0. If the pH of the acidic solution is smaller than 0.7, not only is the oxide coating dissolved but also alloy particles are dissolved. On the other hand, if the pH of the acidic solution is greater than 2.0, an oxide coating on the surface of the alloy is not sufficiently dissolved.

DESCRIPTION OF PREFERRED EMBODIMENTS

The present invention is described below in detail in conjunction with certain examples and with reference to the drawings. However, it is of course understood that the present invention is not limited to the following examples. The present invention can be modified within the scope of the appended claims.

EXAMPLE 1

Batteries were prepared using hydrogen-absorbing alloy electrodes, which were treated with acidic solutions including various additives and without additives to determine the effects on battery characteristics.

[Preparation of Alloy $MmNi_{3.1}Co_{0.8}Al_{0.4}Mn_{0.7}$]

Mm (mixture of La:25, Ce:50, Pr:6 and Nd:19), Ni, Co, Al and Mn (elemental metal: purity of 99.9%) were mixed at a mole ratio of 1.0:3.1:0.8:0.4:0.7 and dissolved in an arc fusion furnace in an atmosphere of argon. A hydrogen-absorbing alloy represented by $MmNi_{3.1}Co_{0.8}Al_{0.4}Mn_{0.7}$ was prepared after natural cooling. Ingots of the alloy were crushed mechanically to prepare alloy powder having an average particle diameter of 80 μm.

[Preparation of Alloy Sample]

Hydrochloric acid solution having a pH of 1.0 as an acidic solution was prepared and 2,2'-bipyridine solution in a concentration of 10 ppm, which was prepared separately, was added to the acidic solution to prepare a treatment solution. The alloy particles were treated with the treatment solution, the temperature of which was maintained at 25° C. That is, the alloy particles were immersed and stirred in the solution for 15 minutes, were filtered with suction, and washed with water and dried to obtain an alloy sample "a".

[Assembling of Battery]

100 weight parts of the alloy sample "a" prepared above and 20 weight parts of a 5 wt % polyethylene oxide (PEO) solution were mixed to prepare a paste. The paste was coated and filled on both sides of an electrical-conductive core material which was a punched metal of a nickel plated plate, dried at room temperature, and cut into a predetermined size to prepare a hydrogen-absorbing alloy electrode. An AA size alkaline secondary battery (battery A) having 1000 mAh of battery capacity, which was a positive electrode control type, was assembled.

A sintered nickel electrode was used as a positive electrode, an alkali resistant unwoven fabric cloth was used as a separator, and 30 wt % of potassium hydroxide solution was used as an electrolyte.

FIG. 1 is a cross-sectional view of the battery assembled above, and comprises a positive electrode (1), a negative electrode (2), a separator (3), a positive lead (4), a negative lead (5), a positive external terminal (6), a negative can (7), a sealing lid (8), a coil spring (9) and an insulating packing (10). The positive electrode (1) and the negative electrode (2) were rolled and spirally wound via the separator (3), and housed in the negative can (7). The positive electrode (1) was connected to the sealing lid (8) via positive lead (4), and the negative electrode (2) was connected to the negative can (7) via negative lead (5). Insulating packings (10) were placed at joints of the negative can (7) and the sealing lid (8) to seal the battery. A coil spring (9) was placed between the positive external terminal (6) and the sealing lid (8) to release gas inside the battery to the atmosphere when an internal pressure of the battery increased unusually.

EXAMPLE 2 to 5

Batteries B to E of the present invention were prepared in the same manner as Example 1 except that alloy samples "b" to "e", respectively, were prepared using a chelating agent other than 2,2'-bipyridine. Chelating agents used in preparing alloy samples "b" to "e" were as follows:

b: diethyldithiocarbamate;
c: 2-mercaptobenzothiazole;
d: Metanil Yellow; and
e: potassium hexacyanoferrate (III).

COMPARATIVE EXAMPLE 1

A comparative battery X1 was prepared in the same manner as Example 1 except that alloy sample x1 was prepared by treatment with an acidic solution containing pyridine, which is a chelating agent to metal elements other than nickel, instead of 2,2'-bipyridine. Pyridine is a chelating agent, but it does not form a chelate compound with nickel.

COMPARATIVE EXAMPLE 2

A comparative battery X2 was prepared in the same manner as in Example 1 except that alloy sample x2 was prepared by treatment with a hydrochloric acid solution having a pH of 1.0 instead of the acidic solution containing 2,2'-bipyridine.
Evaluation of Battery Characteristics Batteries A to E of the present invention and comparative batteries X1 and X2 that were prepared using alloy samples "a" to "e" and "x1" and "x2", respectively, as a negative electrode material were evaluated for the charging time required for the batteries to reach 10 kgf/cm$^2$ of internal pressure and for high rate discharge capacity.
[Internal Pressure of Battery]

Each battery was charged at 1.0 C of current at 25° C., internal pressure was measured, charging of the battery was continued until internal pressure reached 10 kgf/cm$^2$, and the time to reach this internal pressure was recorded.
[High Rate discharge Capacity]

Each battery was charged at 0.2 C of current at 25° C. for 6 hours, and discharged at 1 C to 1.0 V. Then the battery was charged at 1 C for one hour, and discharged at 1 C to 1.0 V (this cycle was considered one cycle). Charge and discharge cycles were repeated three more times. At the next cycle, the battery was charged at 2 C to 1 V, and discharge capacity (mAh) was measured.

The results are shown in Table 1.

Batteries A to E of the present invention took longer to reach 10 kgf/cm$^2$ of internal pressure as compared to comparative batteries X1 and X2. Increase of internal pressure during discharge was prevented in the present invention.

Batteries A to E of the present invention had increased high rate discharge capacity as compared to comparative batteries X1 and X2. The results show that the present invention improves battery activation characteristics. Even in the comparative example prepared using an acidic solution containing the chelating agent, pyrydine, high rate discharge capacity of the battery did not improve. Therefore, a chelating agent for nickel is required in the present invention.

EXAMPLES 6 to 13

Batteries of the present invention F1 to F5 (where F3 is the same as A in Example 1) were prepared using alloy samples f1 to f5, respectively, in the same manner as Example 1 except that the pH of the acidic solution was varied between 0.5 and 3.0 (0.5, 0.7, 1.0, 2.0 and 3.0, respectively) to determine the effect on internal pressure and high discharge capacity.

Batteries of the present invention G1 to G3 (where G2 is the same as D in Example 4) were prepared using alloy samples g1 to g3, respectively, in the same manner as Example 4 except that the pH of the acidic solution was varied between 0.7 and 2.0 (0.7, 1.0 and 2.0, respectively) to determine the effect on internal pressure and high discharge capacity.

The results are shown in Table 2.

TABLE 1

| EXAMPLE | ALLOY | ADDITIVE | AMOUNT OF ADDITIVE (ppm) | BATTERY | INTERNAL PRESSURE PROPERTY (min) | HIGH RATE DISCHARGE CAPACITY (mAh) |
|---|---|---|---|---|---|---|
| Ex. 1 | a | 2,2'-Bipyridine | 10 | A | 140 | 750 |
| Ex. 2 | b | Sodium diethyldithio carbamate | 10 | B | 130 | 730 |
| Ex. 3 | c | 2-Mercaptobenzothiazole | 10 | C | 135 | 720 |
| Ex. 4 | d | Metanil Yellow | 10 | D | 145 | 740 |
| Ex. 5 | e | Potassium hexocyanoferrate (III) | 10 | E | 130 | 730 |
| Com. Ex. 1 | x1 | Pyridine | 10 | X1 | 110 | 690 |
| Com. Ex. 2 | x2 | — | — | X2 | 110 | 690 |

TABLE 2

| EXAMPLE | ALLOY | ADDITIVE | pH | BATTERY | INTERNAL PRESSURE PROPERTY (min) | HIGH RATE DISCHARGE CAPACITY (mAh) |
|---|---|---|---|---|---|---|
| Ex. 6 | f 1 | 2,2'-Bipyridine | 0.5 | F1 | 120 | 710 |
| Ex. 7 | f 2 | 2,2'-Bipyridine | 0.7 | F2 | 135 | 760 |
| Ex. 8 | f 3 | 2,2'-Bipyridine | 1.0 | F3 | 140 | 750 |
| Ex. 9 | f 4 | 2,2'-Bipyridine | 2.0 | F4 | 135 | 730 |

TABLE 2-continued

| EXAMPLE | ALLOY | ADDITIVE | pH | BATTERY | INTERNAL PRESSURE PROPERTY (min) | HIGH RATE DISCHARGE CAPACITY (mAh) |
|---|---|---|---|---|---|---|
| Ex. 10 | f 5 | 2,2'-Bipyridine | 3.0 | F5 | 120 | 700 |
| Ex. 11 | g 1 | Metanil Yellow | 0.7 | G1 | 135 | 750 |
| Ex. 12 | g 2 | Metanil Yellow | 1.0 | G2 | 145 | 740 |
| Ex. 13 | g 3 | Metanil Yellow | 2.0 | G3 | 135 | 730 |

Internal pressure and high rate discharge capacity were improved in batteries having a hydrogen-absorbing alloy electrode treated with an acidic solution having a pH in a range of 0.7 to 2.0. Therefore, a preferred pH is 0.7 to 2.0.

EXAMPLES 14 to 18

Batteries of the present invention (H1 to H5) were prepared using alloy samples h1 to h5, respectively, in the same manner as Example 1 except that the amount of chelating agent, 2,2'-bipyridine, was varied from 0.1 to 200 ppm (0.1, 1.0, 10.0, 100 and 200 ppm, respectively) to determine the effect on internal pressure and high rate discharge capacity.

Test results are shown in Table 3.

High rate discharge capacity was also improved in batteries H2 to H4. Therefore, a preferred amount of 2,2'-bipyridine as a chelating agent is 1.0 to 100 ppm.

EXAMPLES 19 to 22

Batteries of the present invention (J1 to J3 and K) were prepared using alloy sample j1 to j3 and k, respectively, in the same manner as Example 1 except that various amount of a chelating agent, Metanil Yellow (1.0, 10.0 and 100 ppm) and a mixture of 2,2'-bipyridine and Metanil Yellow (10 ppm

TABLE 3

| EXAMPLE | ALLOY | ADDITIVE | AMOUNT OF ADDITIVE (ppm) | BATTERY | INTERNAL PRESSURE PROPERTY (min) | HIGH RATE DISCHARGE CAPACITY (mAh) |
|---|---|---|---|---|---|---|
| Ex. 14 | h1 | 2,2'-Bipyridine | 0.1 | H1 | 120 | 710 |
| Ex. 15 | h2 | 2,2'-Bipyridine | 1.0 | H2 | 135 | 740 |
| Ex. 16 | h3(a) | 2,2'-Bipyridine | 10.0 | H3 | 140 | 750 |
| Ex. 17 | h4 | 2,2'-Bipyridine | 100 | H4 | 135 | 730 |
| Ex. 18 | h5 | 2,2'-Bipyridine | 200 | H5 | 125 | 710 |

Required time to reach 10 kgf/cm² of internal pressure was extended in batteries H2 to H4 having a hydrogen-absorbing alloy electrode treated with an acidic solution containing an amount of 1.0 to 100 ppm 2,2'-bipyridine.

each) were added to an acidic solution to determine the effect on internal pressure and high rate discharge capacity.

The results are shown in Table 4.

TABLE 4

| EXAMPLE | ALLOY | ADDITIVE | AMOUNT OF ADDITIVE (ppm) | BATTERY | INTERNAL PRESSURE PROPERTY (min) | HIGH RATE DISCHARGE CAPACITY (mAh) |
|---|---|---|---|---|---|---|
| Ex. 19 | j1 | Metanil Yellow | 1.0 | J1 | 140 | 740 |
| Ex. 20 | j2 | Metanil Yellow | 10.0 | J2 | 145 | 740 |
| Ex. 21 | j3 | Metanil Yellow | 100 | J3 | 135 | 720 |
| Ex. 22 | k | 2,2'-Bipyridine Metanil Yellow | 10.0 10.0 | K | 140 | 750 |

The results show that batteries J1 to J3 and K are improved in both internal pressure and high rate discharge capacity, especially, increase of internal pressure was well inhibited.

According to the results shown in Tables 3 and 4, a preferred concentration of a chelating agent, e.g., either 2,2'-bipyridine alone, Metanil Yellow alone or mixture of 2,2'-bipyridine and Metanil Yellow is 1.0 to 100 ppm.

ADVANTAGES OF THE INVENTION

Particles of a hydrogen-absorbing alloy containing nickel treated with an acidic solution containing a chelating agent for nickel have many gaps inside and a metallic nickel layer is formed on the surface. The nickel layer prevents the surface of alloy particles from oxidation and alloy particles are active to absorb hydrogen gas. Therefore, a hydrogen-absorbing alloy electrode treated with the acidic solution has increased area for contact with an electrolyte, i.e., the contact area of electrode with electrolyte is increased to decrease extra voltage which occurs by an oxidation reduction reaction of hydrogen.

The present invention provides that a battery prepared using the hydrogen-absorbing alloy has a large high rate discharge capacity soon after being assembled, and inhibits an increase of internal pressure during discharge. Industrial value of the present invention is significant.

What is claimed is:

1. A hydrogen-absorbing alloy electrode for an alkaline secondary battery comprising a hydrogen-absorbing alloy containing nickel wherein said hydrogen-absorbing alloy has been treated with an acidic solution containing a chelating agent for nickel.

2. A hydrogen-absorbing alloy electrode for an alkaline secondary battery according to claim 1, wherein said chelating agent is at least one agent selected from the group consisting of 2,2'-bipyridine, diethyldithiocarbamate, 2-mercaptobenzothiazole, Metanil Yellow and potassium hexacyanoferrate(III).

3. A method of manufacturing a hydrogen-absorbing alloy electrode for an alkaline secondary battery comprising immersing a hydrogen-absorbing alloy in an acidic solution containing a chelating agent for nickel.

4. A method of manufacturing a hydrogen-absorbing alloy electrode for an alkaline secondary battery according to claim 3, wherein said chelating agent is at least one agent selected from the group consisting of 2,2'-bipyridine, diethyldithiocarbamate, 2-mercaptobenzothiazole, Metanil Yellow and potassium hexacyanoferrate(III).

5. A method of manufacturing a hydrogen-absorbing alloy electrode for an alkaline secondary battery according to claim 3, wherein said acidic solution has a pH in a range of 0.7 to 2.0.

6. A method of manufacturing a hydrogen-absorbing alloy electrode for an alkaline secondary battery according to claim 3, wherein said chelating agent is present in an amount of 1.0 to 100 ppm.

* * * * *